Nov. 27, 1962  P. PATZ ETAL  3,065,867
WHEEL CLEANER FOR SILO UNLOADERS
Filed Feb. 13, 1961

INVENTORS
P. Patz
BY E. A. Graetz
Lieber, Lieber & Miller
Attorneys

United States Patent Office 3,065,867
Patented Nov. 27, 1962

3,065,867
WHEEL CLEANER FOR SILO UNLOADERS
Paul Patz and Edward A. Graetz, Pound, Wis.
Filed Feb. 13, 1961, Ser. No. 88,837
1 Claim. (Cl. 214—17)

The present invention relates generally to silo unloaders of the type having a conveyor that is revolved about the inside of the silo to progressively feed material from the top and downwardly as the unloader is revolved about the silo. More specifically the invention relates to supporting wheels for the unloader which have means for permitting them to break free if they have been frozen in the ensilage and for breaking free any frozen material from the periphery of these wheels.

In devices of this general type, it is necessary to maintain the conveyor at a predetermined cutting depth and in a level position so as to uniformly scrape along the upper surface of the material. It is therefore important not only that the supporting wheels are accurately adjusted in a vertical direction to properly position the conveyor for even feeding, but also that their periphery are kept free of any ensilage which would cause the conveyor to be held at an improper position.

Furthermore, the ensilage at the center of the silo and on which these support wheels rotate, often becomes frozen. For example, after the unloader has been working for a time, the ensilage at the center of the silo may be relatively soft and wet, at least it is moist and not frozen. By the time the next day's operation resumes, however, the entire top layer of ensilage may be frozen and these support wheels are then frozen in place in the ensilage. Before the operation can commence, these wheels must be broken free so they can rotate and any frozen material must be broken from them so as to insure proper operation of the conveyor, as heretofore mentioned.

In addition, frozen material on the wheels' periphery causes binding between other associated parts, such as the frame yoke, and consequent malfunctioning of other parts, such as the side guide arm for centralizing the unloader.

Accordingly, the present invention provides means carried by these support wheels which insure that the wheels can break themselves free from a frozen position in the ensilage and are cleared of any frozen material as soon as they begin to revolve. The invention is such that this cleaning means automatically functions as soon as the wheels begin to turn. More particularly, these cleaning means are shiftably mounted around the wheels' periphery and are caused to shift relative to the periphery by rotation of the wheel.

These and other objects and advantages of the present invention will appear hereinafter as this disclosure progresses, reference being had to the drawings in which.

Figure 1:
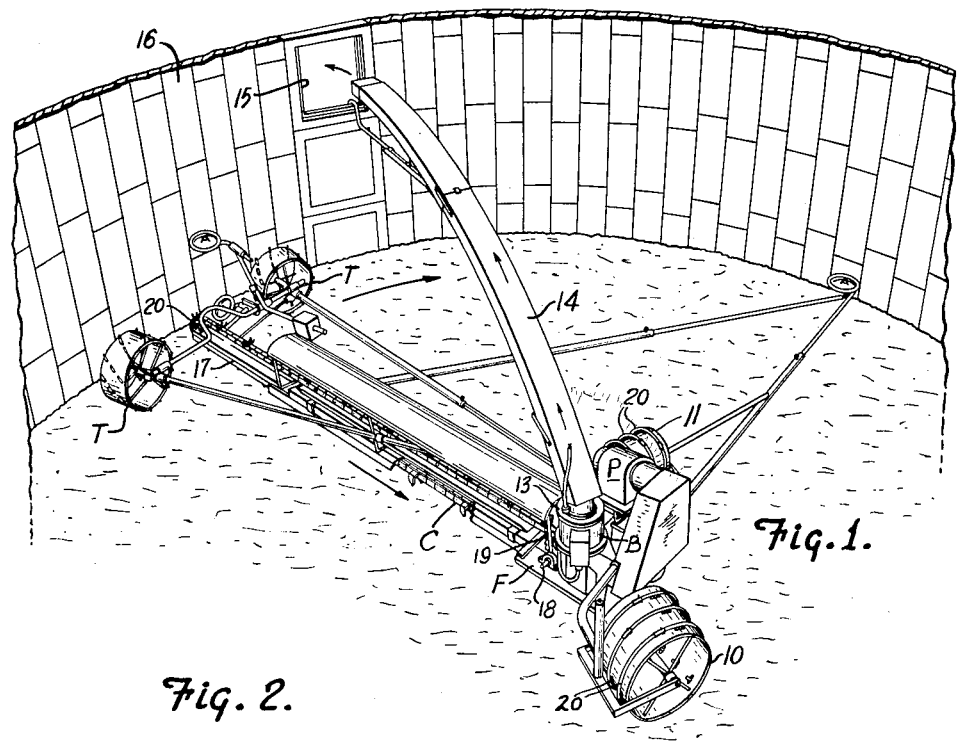
FIGURE 1 is a perspective view of a silo unloader embodying the present invention.
Figure 2:
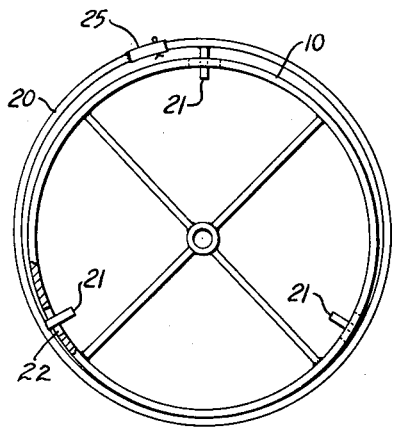
FIGURE 2 is a side elevational view of one of the wheels shown in FIGURE 1, but on an enlarged scale and certain parts broken away for clarity.
Figure 3:
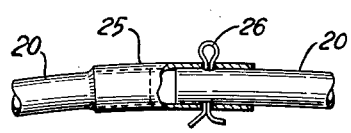
FIGURE 3 is an enlarged detail view, in section, of one of the joints in the cleaning ring.

Referring more particularly to the drawings, FIGURE 1 shows a silo unloader of the type which may utilize the present invention, although the invention finds utility with various other types of unloaders. For the purposes of this disclosure, however, it is believed sufficient to say that the unloader consists of an endless conveyor C extending radially from the center of the silo which serves to pull the material inwardly to a blower B as the conveyor is revolved around the silo by the large traction wheels T located at the outer end of the conveyor. From the inner end of the conveyor a discharge spout 14 extends from the blower and is radially stationary and directed out of the silo opening 15 in the wall 16 to discharge material therethrough.

The conveyor is of the endless type which is carried by the conveyor frame 17, more specifically the conveyor is trained around an inner sprocket 19 and an outer sprocket 20. The conveyor frame is pivotally mounted about shaft 18 carried by the main frame F, on which shaft the sprocket 19 is fixed and driven thereby.

Thus the inner end of the conveyor, the blower B, spout 14 and the power source P for operating the traction wheels, conveyor and blower, are all supported by the main frame F, which frame in turn is supported by large wheels 10 and 11. These wheels thus support the inner end of the entire unit and rotate in a small path about the center of the silo as the entire unloader swings around the silo. These wheels are necessarily quite wide, and are preferably formed of a steel plate. Any number of these support wheels may be used, and the two as shown, which are similar to one another, have proven to be satisfactory in supporting and stabilizing the inner end of the unloader.

During the cold season, the ensilage material which is located generally adjacent the silo wall 16 is frozen and remains frozen or hard throughout the cold period. The ensilage located at the more central portion of the silo, however, does not freeze, except for the top layer when left for a sufficient period of time. It is on this central portion of the ensilage that the inner support wheels of the unloader rotate and it is in this area that problems have arisen to which the present invention is directed.

During the operation of the unloader, the ensilage in the central area of the silo does not have an opportunity to freeze because it is scraped off and removed from the silo before it has a chance to do so. During the unloading operation this central area is often very moist and relatively soft. During a period of inactivity, however, such as overnight, the top layer of this central portion often freezes, and the support wheels are thereby frozen into the top layer. When the power unit is started the next day, it is incapable of freeing the wheels from the frozen ensilage because of the dead weight of the unloader and the fact that the wheels cannot be moved even slightly to crack them free. This breaking of the wheels loose has heretofore been done manually by the operator before the unloading can commence. Even when the wheels are eventually worked free, a considerable amount or chunks of frozen ensilage may remain frozen to their periphery.

According to the present invention, shiftable means are mounted around the periphery of these wide and smooth support wheels, which initially permits sufficient play or movement of the frozen-in wheels to enable the power unit to overcome the initial dead and fixed load of the unloader. This shiftable means is moved relative to the periphery of the wheels whenever the wheel is rotated, and the action of the wheel in moving over the silage causes this means to break off any remaining frozen ensilage from the wheel's periphery.

The means above mentioned for so removing the material is shown as consisting of a series of ring members 20 which are of an internal diameter larger than the outside diameter of the wheel. Any number of these rings may be utilized, but the invention as shown utilizes three rings spaced axially on the wheel periphery. These rings are held in this axially spaced relationship on the wheel by a series of radially inwardly extending rods 21 which are welded to the rings and extend through relatively larger apertures 22 in the wheel's periphery.

By so mounting these rings on the wheels, the rings are free to shift in a radial direction relative to the wheel. Thus the lower portion of the wheel always bears tightly against the rings while a considerable space is provided between the uppermost portion of the wheel and the upper portion of the ring. As the wheel rotates the ring becomes increasingly spaced from the wheel, until the top position is reached. At that time the ring in its downward descent at the front side of the wheel again approaches the periphery of the wheel.

When the rings are frozen in the ensilage, this relative movement between the rings and the wheel periphery permits just sufficient "give" of the wheels to enable them to break free of the ensilage, allowing the unloader to be revolved. The continual movement between the rings and the wheel periphery causes any remaining frozen ensilage on the wheel's periphery to be forcibly broken off and removed from the wheel.

To facilitate assembly and disassembly of the rings on the wheels, a detachable slip joint is formed in each ring to permit the diameter of the ring to be increased and the rods 21 to be inserted in their apertures. This joint includes a sleeve 25 which is welded to one end of the ring and extends therefrom. The other end of the ring is slipped into the extending end of the sleeve and held captive therein by a cotter pin 26. The diameter of the ring when assembled is such that the rods 21 cannot become free from their apertures.

By means of the present invention the unloader can be started under its own power and the frozen silage material entirely and effectively removed from the wheels. No special cleaning action of these wheels is required before commencing an operation and are completely cleaned of frozen material to permit them to function to accurately locate the conveyor supported thereby.

Various modes of carrying out the invention are contemplated as being within the scope of the following claim particularly pointing out and distinctly claiming the subject matter which is regarded as the invention.

What is claimed and desired to be secured by Letters Patent is:

In a silo unloader of the type having an elongated conveyor including an inner end and an outer end, traction means located at the outer end for revolving the conveyor about its inner end, and a support wheel having a wide and smooth periphery and located adjacent the inner end of said conveyor for holding said inner end in a predetermined vertical position, the improvement residing in said wheel having a series of circumferentially spaced apertures, said apertures being arranged in rows around the periphery of said wheels, said rows being axially spaced apart from one another, a series of rings mounted around and axially spaced along the width of said wheel and of a larger diameter than the periphery of said support wheel, said rings each having a series of radially inwardly extending rods which extend loosely through said apertures, whereby said rings can shift radially relative to said wheel and thereby clean material therefrom, said rings each having a detachable slip joint whereby they can be opened up to facilitate the insertion of said rods into said apertures.

References Cited in the file of this patent

UNITED STATES PATENTS

| | | |
|---|---|---|
| 1,146,237 | Cobb | July 13, 1915 |
| 1,782,637 | Thies et al. | Nov. 25, 1930 |
| 2,221,756 | Burkhardt | Nov. 19, 1940 |
| 2,970,827 | Dodson | Feb. 7, 1961 |
| 3,017,044 | Englemann | Jan. 16, 1962 |